US012587426B2

(12) United States Patent (10) Patent No.: US 12,587,426 B2
Korpi et al. (45) Date of Patent: Mar. 24, 2026

(54) SIGNAL TRANSMISSION BASED ON TRANSFORMED SIGNAL CONSTELLATION

(71) Applicant: Nokia Technologies Oy, Espoo (FI)

(72) Inventors: Dani Johannes Korpi, Espoo (FI);
Mikko Johannes Honkala, Espoo (FI);
Janne Matti Juhani Huttunen, Espoo
(FI); Mikko Aleksi Uusitalo, Espoo
(FI)

(73) Assignee: Nokia Technologies Oy, Espoo (FI)

( * ) Notice: Subject to any disclaimer, the term of this
patent is extended or adjusted under 35
U.S.C. 154(b) by 0 days.

(21) Appl. No.: 18/729,416

(22) PCT Filed: Jan. 19, 2022

(86) PCT No.: PCT/EP2022/051104
§ 371 (c)(1),
(2) Date: Jul. 16, 2024

(87) PCT Pub. No.: WO2023/138763
PCT Pub. Date: Jul. 27, 2023

(65) Prior Publication Data
US 2025/0119335 A1 Apr. 10, 2025

(51) Int. Cl.
*H04L 27/34* (2006.01)
(52) U.S. Cl.
CPC ................................ *H04L 27/3405* (2013.01)
(58) Field of Classification Search
CPC .... H04L 27/3405; H04L 27/34; H04L 1/0003
See application file for complete search history.

(56) References Cited

U.S. PATENT DOCUMENTS

| | | | |
|---|---|---|---|
| 11,044,049 B1 * | 6/2021 | James | H04L 1/0026 |
| 2003/0045249 A1 * | 3/2003 | Nielsen | H03C 3/40 |
| | | | 455/117 |
| 2011/0013616 A1 | 1/2011 | Fischer et al. | |
| 2015/0016571 A1 * | 1/2015 | McCoy | H04L 27/3863 |
| | | | 375/346 |
| 2019/0052509 A1 | 2/2019 | Krishnan et al. | |
| 2021/0194620 A1 | 6/2021 | James et al. | |
| 2021/0282030 A1 | 9/2021 | Barsoum et al. | |

(Continued)

FOREIGN PATENT DOCUMENTS

| | | |
|---|---|---|
| WO | 2019/193377 A1 | 10/2019 |
| WO | 2020/239232 A1 | 12/2020 |
| WO | 2021/115618 A1 | 6/2021 |

(Continued)

OTHER PUBLICATIONS

Aoudia et al., "End-to-end Learning for OFDM: From Neural
Receivers to Pilotless Communication", arXiv, Oct. 13, 2020, pp.
1-30.

(Continued)

*Primary Examiner* — Freshteh N Aghdam
(74) *Attorney, Agent, or Firm* — Nokia Technologies Oy

(57) ABSTRACT

Disclosed is a method comprising transforming, by a termi-
nal device, a signal constellation based on one or more
parameter values, wherein the one or more parameter values
indicate a shape of the transformed signal constellation; and
transmitting, by the terminal device, one or more signals
based at least partly on the transformed signal constellation.

20 Claims, 8 Drawing Sheets

(56)  References Cited

U.S. PATENT DOCUMENTS

2021/0368363  A1      11/2021   Barsoum et al.

FOREIGN PATENT DOCUMENTS

| | | |
|---|---|---|
| WO | 2021/155927 A1 | 8/2021 |
| WO | 2021/181002 A1 | 9/2021 |

OTHER PUBLICATIONS

International Search Report and Written Opinion received for corresponding Patent Cooperation Treaty Application No. PCT/EP2022/051104, dated Sep. 21, 2022, 16 pages.

Korpi et al., "Waveform Learning for Reduced Out-of-Band Emissions Under a Nonlinear Power Amplifier", arXiv, Jan. 14, 2022, 6 pages.

Hoydis et al., "Toward a 6G AI-Native Air Interface", arXiv, Apr. 30, 2021, pp. 1-7.

Notice of Allowance received for corresponding European Patent Application No. 22704292.6, dated Jan. 17, 2025, 8 pages.

* cited by examiner

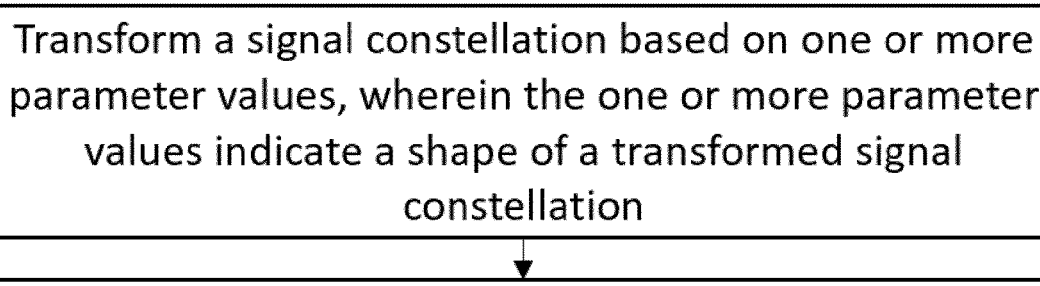

801    Transform a signal constellation based on one or more parameter values, wherein the one or more parameter values indicate a shape of a transformed signal constellation 802    Transmit one or more signals based at least partly on the transformed signal constellation

FIG. 8

901    Indicate one or more parameter values, wherein the one or more parameter values indicate a shape of a transformed signal constellation 902    Receive one or more signals based at least partly on the transformed signal constellation

SIGNAL TRANSMISSION BASED ON TRANSFORMED SIGNAL CONSTELLATION

RELATED APPLICATION

This application claims priority to PCT Patent Application No. PCT/EP2022/051104, filed Jan. 19, 2022, which is incorporated herein by reference in its entirety.

FIELD

The following exemplary embodiments relate to wireless communication.

BACKGROUND

As resources are limited, it is desirable to optimize the usage of network resources.

SUMMARY

The scope of protection sought for various exemplary embodiments is set out by the claims. The exemplary embodiments and features, if any, described in this specification that do not fall under the scope of the claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: transform a signal constellation based on one or more parameter values, wherein the one or more parameter values indicate a shape of the transformed signal constellation; and transmit one or more signals based at least partly on the transformed signal constellation.

According to another aspect, there is provided an apparatus comprising means for: transforming a signal constellation based on one or more parameter values, wherein the one or more parameter values indicate a shape of the transformed signal constellation; and transmitting one or more signals based at least partly on the transformed signal constellation.

According to another aspect, there is provided a method comprising: transforming, by a terminal device, a signal constellation based on one or more parameter values, wherein the one or more parameter values indicate a shape of the transformed signal constellation; and transmitting, by the terminal device, one or more signals based at least partly on the transformed signal constellation.

According to another aspect, there is provided a computer program product comprising program instructions which, when run on a computing apparatus, cause the computing apparatus to perform at least the following: transforming a signal constellation based on one or more parameter values, wherein the one or more parameter values indicate a shape of the transformed signal constellation; and transmitting one or more signals based at least partly on the transformed signal constellation.

According to another aspect, there is provided a computer program comprising instructions for causing an apparatus to perform at least the following: transforming a signal constellation based on one or more parameter values, wherein the one or more parameter values indicate a shape of the transformed signal constellation; and transmitting one or more signals based at least partly on the transformed signal constellation.

According to another aspect, there is provided a computer readable medium comprising program instructions for causing an apparatus to perform at least the following: transforming a signal constellation based on one or more parameter values, wherein the one or more parameter values indicate a shape of the transformed signal constellation; and transmitting one or more signals based at least partly on the transformed signal constellation.

According to another aspect, there is provided a non-transitory computer readable medium comprising program instructions for causing an apparatus to perform at least the following: transforming a signal constellation based on one or more parameter values, wherein the one or more parameter values indicate a shape of the transformed signal constellation; and transmitting one or more signals based at least partly on the transformed signal constellation.

According to another aspect, there is provided an apparatus comprising at least one processor, and at least one memory including computer program code, wherein the at least one memory and the computer program code are configured, with the at least one processor, to cause the apparatus to: indicate, to a terminal device, one or more parameter values, wherein the one or more parameter values indicate a shape of a transformed signal constellation; and receive, from the terminal device, one or more signals based at least partly on the transformed signal constellation.

According to another aspect, there is provided an apparatus comprising means for: indicating, to a terminal device, one or more parameter values, wherein the one or more parameter values indicate a shape of a transformed signal constellation; and receiving, from the terminal device, one or more signals based at least partly on the transformed signal constellation.

According to another aspect, there is provided a method comprising: indicating, by a network element of a wireless communication network, to a terminal device, one or more parameter values, wherein the one or more parameter values indicate a shape of a transformed signal constellation; and receiving, by the network element, from the terminal device, one or more signals based at least partly on the transformed signal constellation.

According to another aspect, there is provided a computer program comprising instructions for causing an apparatus to perform at least the following: indicating, to a terminal device, one or more parameter values, wherein the one or more parameter values indicate a shape of a transformed signal constellation; and receiving, from the terminal device, one or more signals based at least partly on the transformed signal constellation.

According to another aspect, there is provided a computer program product comprising program instructions which, when run on a computing apparatus, cause the computing apparatus to perform at least the following: indicating, to a terminal device, one or more parameter values, wherein the one or more parameter values indicate a shape of a transformed signal constellation; and receiving, from the terminal device, one or more signals based at least partly on the transformed signal constellation.

According to another aspect, there is provided a computer readable medium comprising program instructions for causing an apparatus to perform at least the following: indicating, to a terminal device, one or more parameter values, wherein the one or more parameter values indicate a shape of a transformed signal constellation; and receiving, from the terminal device, one or more signals based at least partly on the transformed signal constellation.

According to another aspect, there is provided a non-transitory computer readable medium comprising program instructions for causing an apparatus to perform at least the following: indicating, to a terminal device, one or more parameter values, wherein the one or more parameter values indicate a shape of a transformed signal constellation; and receiving, from the terminal device, one or more signals based at least partly on the transformed signal constellation.

According to another aspect, there is provided a system comprising at least a terminal device and a network element of a wireless communication network. The network element is configured to: indicate, to the terminal device, one or more parameter values, wherein the one or more parameter values indicate a shape of a transformed signal constellation; and receive, from the terminal device, one or more signals based at least partly on the transformed signal constellation. The terminal device is configured to: transform a signal constellation based on the one or more parameter values indicated by the network element; and transmit, to the network element, the one or more signals based at least partly on the transformed signal constellation.

According to another aspect, there is provided a system comprising at least a terminal device and a network element of a wireless communication network. The network element comprises means for: indicating, to the terminal device, one or more parameter values, wherein the one or more parameter values indicate a shape of a transformed signal constellation; and receiving, from the terminal device, one or more signals based at least partly on the transformed signal constellation. The terminal device comprises means for: transforming a signal constellation based on the one or more parameter values indicated by the network element; and transmitting, to the network element, the one or more signals based at least partly on the transformed signal constellation.

BRIEF DESCRIPTION OF THE DRAWINGS

In the following, various exemplary embodiments will be described in greater detail with reference to the accompanying drawings, in which

FIGS. 7-9 illustrate flow charts according to some exemplary embodiments;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A), new radio (NR, 5G), or beyond 5G, without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
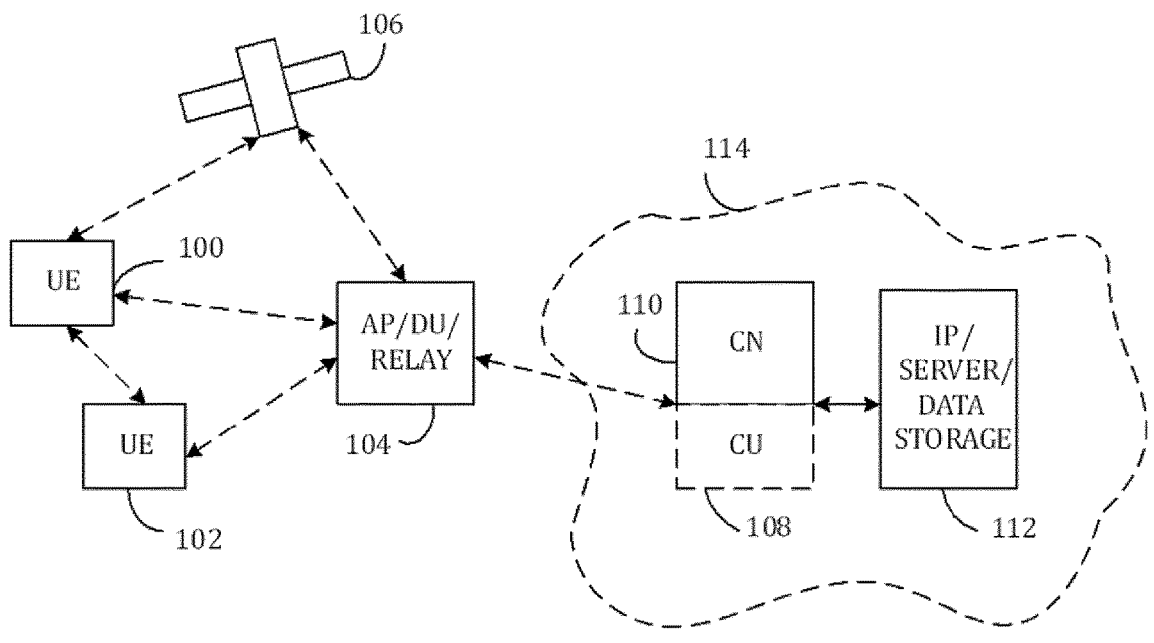
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g) NodeB) 104 providing the cell. The physical link from a user device to a (e/g) NodeB may be called uplink or reverse link and the physical link from the (e/g) NodeB to the user device may be called downlink or forward link. It should be appreciated that (e/g) NodeBs or their functionalities may be implemented by using any node, host, server or access point etc. entity suitable for such a usage.

A communication system may comprise more than one (e/g) NodeB, in which case the (e/g) NodeBs may also be configured to communicate with one another over links, wired or wireless, designed for the purpose. These links may be used for signaling purposes. The (e/g) NodeB may be a computing device configured to control the radio resources of communication system it is coupled to. The (e/g) NodeB may also be referred to as a base station, an access point or any other type of interfacing device including a relay station capable of operating in a wireless environment. The (e/g) NodeB may include or be coupled to transceivers. From the transceivers of the (e/g) NodeB, a connection may be provided to an antenna unit that establishes bi-directional radio links to user devices. The antenna unit may comprise a plurality of antennas or antenna elements. The (e/g) NodeB may further be connected to core network 110 (CN or next generation core NGC). Depending on the system, the counterpart on the CN side may be a serving gateway (S-GW, routing and forwarding user data packets), packet data network gateway (P-GW) for providing connectivity of user devices (UEs) to external packet data networks, mobility management entity (MME), access and mobility management function (AMF), or location management function (LMF), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node.

An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and UE(s), and/or between the IAB node and other IAB nodes (multi-hop scenario).

Another example of such a relay node may be a layer 1 relay called a repeater or a smart repeater. The repeater may amplify a signal received from a base station and forward it to a UE, and/or amplify a signal received from the UE and forward it to the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize non-terrestrial communication, for example satellite communication, to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may also comprise other apparatuses, such as physical layer relay nodes or other network elements, etc. At least one of the (e/g) NodeBs or may be a Home (e/g) nodeB.

Furthermore, the (e/g) nodeB or base station may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) (also known as a centralized unit) that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g) nodeB or base station. The DU may be defined as a logical node hosting radio link control (RLC), medium access control (MAC) and/or physical (PHY) layers of the (e/g) nodeB or base station. The operation of the DU may be at least partly controlled by the CU. The CU may comprise a control plane (CU-CP), which may be defined as a logical node hosting the RRC and the control plane part of the PDCP protocol of the CU for the (e/g) nodeB or base station. The CU may further comprise a user plane (CU-UP), which may be defined as a logical node hosting the user plane part of the PDCP protocol and the SDAP protocol of the CU for the (e/g) nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g) NodeBs may be needed to provide such a network structure.

For fulfilling the need for improving the deployment and performance of communication systems, the concept of "plug-and-play" (e/g) NodeBs may be introduced. A network which may be able to use "plug-and-play" (e/g) NodeBs, may include, in addition to Home (e/g) NodeBs (H (e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Machine learning (ML) and/or other artificial intelligence (AI) algorithms may be applied in various areas of a communication system. For example, various deep learning-based solutions may be used for enhancing the physical layer performance of wireless communication systems. Deep learning is a class of machine learning algorithms that uses multiple layers to progressively extract higher-level features from the raw input. Deep learning may be suitable for implementing tasks, for which the optimal solution is very complex or unknown. In the context of the sixth generation (6G) and beyond, end-to-end learning of the whole wireless link may be considered as one possible application for deep learning.

Figure 2:
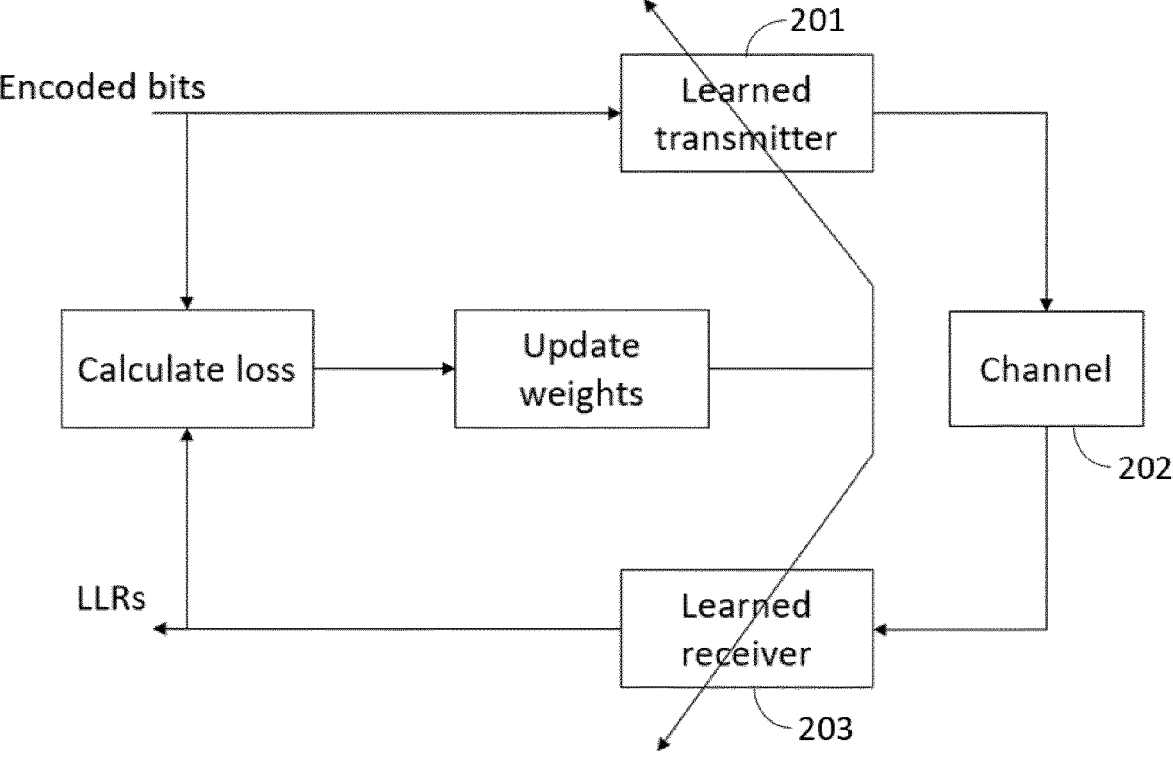
FIG. 2 provides a simplified illustration of end-to-end learning of a wireless link.

FIG. 2 provides a simplified illustration of end-to-end learning of a wireless link, where the transmitter 201 and receiver 203 are trained jointly to communicate over a wireless channel 202. This can be done in a supervised manner by considering the transmitted information bits as the input, and the received bits as the output. The received bits should ideally be equal to the transmitted bits. In FIG. 2, LLR is an abbreviation for log-likelihood ratio.

In principle, treating the problem in this way may be based on differentiable models of the components considered during training, including at least the transmitter 201, wireless channel 202, and the receiver 203. In addition, the prominent hardware impairments, such as those stemming from a nonlinear power amplifier (PA), may also need to be included as a differentiable implementation. However, there are also techniques for incorporating non-differentiable components into the learned (trained) system, and some exemplary embodiments may also be applicable to such scenarios. However, it should be noted that some exemplary embodiments may also be applicable with fully differentiable models.

It is also possible to incorporate elements of modulation and waveform schemes into this type of a framework. For instance, the learned (trained) transmitter 201 may utilize orthogonal frequency-division multiplexing (OFDM) modulation before and/or after the learned layers, while the receiver 203 may demodulate the OFDM symbols before and/or after the learned processing.

A specific example of an end-to-end learned system is one where the transmitter learns the signal constellation to be used for data transfer. A signal constellation is a mapping between bits and complex-valued symbols (to be modulated onto a waveform). The symbols may be represented by constellation points in the signal constellation, wherein a given constellation point represents a pre-defined number of bits. The signal constellation may also be referred to as a constellation or a constellation diagram. This learned constellation may be modulated similarly to a legacy constellation (e.g., quadrature amplitude modulation, QAM, constellation), using any modulation scheme (e.g., OFDM). Learning the constellation jointly with the receiver may facilitate pilot-less transmissions, as the transmitter learns an asymmetric constellation, based on which the receiver may learn to detect the signal without any reference signals (i.e., pilots). This results in a considerably improved spectral efficiency, since more resources can be dedicated to data transmission.

However, a challenge with this approach is to extend it to a practical cellular network. For example, it may not be feasible that the UEs and base stations learn to communicate with a new constellation whenever they encounter one another for the first time. Therefore, the transmitter and receiver should by some means agree on the constellation to be used, without inducing excessive signaling overhead. Moreover, it may be beneficial to support legacy QAM transmissions with pilots as well. Pilots may also be referred to as reference signals herein.

A problem to be solved by some exemplary embodiments is how to ensure that the transmitter and receiver can agree on the used constellation with minimal overhead, while still achieving the spectral efficiency gains of an end-to-end learned system and legacy support. The overhead stemming from communicating full constellation points may result in overhead comparable to that of using pilots in the first place, meaning that a more refined solution may be needed.

Some exemplary embodiments are based on parameterized constellation shapes, which facilitate pilot-less detection by a deep learning-based receiver. The constellation shape may be fully defined by one or more parameters that are efficient to communicate.

A constellation shape, i.e., a shape of a signal constellation, refers to a distribution of the corresponding individual constellation points in the utilized space. For example, the utilized space may be the complex plane, where the complex-valued constellation points represent the phases and amplitudes of individual subcarriers. However, it should be noted that this is just one example, and it is possible to encode the information in other ways as well.

Some exemplary embodiments provide a method for signaling parameters that transform the constellation, thus facilitating pilot-less transmissions to an advanced receiver for improved spectral efficiency. For example, a QAM constellation may be transformed for an ML receiver, i.e., a receiver capable of machine learning. Herein the transformation may be any kind of mapping from one set of values to another.

Furthermore, some exemplary embodiments provide a method for quickly adjusting the constellation shape based on prevailing conditions, by communicating said parameters to the UE. For instance, the parameters can be adjusted based on a predicted or estimated UE velocity.

In one exemplary embodiment, two new downlink control information (DCI) formats are described, which can be used to inform the UE about which constellation shape it should use in the forthcoming physical uplink shared channel (PUSCH) transmissions. For example, the optimal constellation parameters may be obtained from a pre-defined table, or by running the training at the gNB by using a differentiable surrogate UE model and a differentiable channel model matched to the prevailing conditions. Values for the prevailing conditions may be obtained from any relevant source, for example from UEs, access points (e.g., gNBs), or elsewhere.

By jointly learning a constellation and a deep neural network-based receiver, it may be possible to transfer data over a multipath channel without including any pilot symbols in the data transmission(s). The reason for this is the asymmetric nature of the learned constellation, which makes it possible for the receiver to blindly deduce which part of the constellation the received symbols originally resided in. That is, while a legacy QAM constellation is ambiguous in terms of the rotation angle (a 90-degree rotation will result in the original constellation shape), a properly designed asymmetric constellation has no such ambiguity. Since the blind detection is based on investigating the statistics of the received symbols, it should be ensured that this asymmetry exhibits itself throughout the complex plane (or whichever space the data is modulated into).

Some exemplary embodiments consider a case, where the asymmetric constellation follows a pre-defined and parameterized shape, with certain design parameters that can be used to modify the constellation for various channel conditions.

In one exemplary embodiment, the following transformation may be defined for a legacy constellation (e.g., QPSK, 16-QAM, 64-QAM, etc.) in the complex plane, which results in the desired asymmetric properties of the transformed constellation in the complex plane:

$$\text{real}(C) = \text{real}(C_{legacy})$$

$$\text{imag}(C) = (\alpha + \beta * (|\min(\text{real}(C_{legacy}))| + \text{real}(C_{legacy}))) * \text{imag}(C_{legacy})$$

where, C is the transformed form of the legacy constellation (e.g., QPSK, 16-QAM, 64-QAM, etc.) in the complex plane, $C_{legacy}$ is the corresponding constellation point in the legacy constellation in the complex plane, and $\alpha$, $\beta>0$ are the adjustable constellation parameters.

For example, with a legacy QAM constellation in the complex plane, the following transformation may be defined for the legacy QAM constellation, which results in the desired asymmetric properties of the transformed QAM constellation in the complex plane:

$$\text{real}(C) = \text{real}(C_{QAM})$$

$$\text{imag}(C) = (\alpha + \beta * (|\min(\text{real}(C_{QAM}))| + \text{real}(C_{QAM}))) * \text{imag}(C_{QAM})$$

where, C is the transformed form of the legacy QAM constellation (e.g., 16-QAM, 64-QAM, etc.), $C_{QAM}$ is the corresponding constellation point in the legacy QAM constellation, and $\alpha$, $\beta > 0$ are the adjustable constellation parameters.

This transformation results in a type of convex isosceles trapezoid in the complex plane, whose angle and dimensions may be adjusted based on the prevailing channel conditions. For example, the first parameter value $\alpha$ may be used to adjust the scaling of the imaginary axis of the constellation, while the second parameter value $\beta$ may be used to control the level of asymmetry of the constellation. The level of asymmetry may also be referred to as slope herein. It should be noted that the ensuing or transformed constellation may be normalized to ensure that the overall transmission power remains substantially the same. This type of a constellation shape is non-ambiguous in terms of both amplitude and phase distortion, facilitating blind detection at the receiver side after being distorted by a multipath channel.

Figure 3:
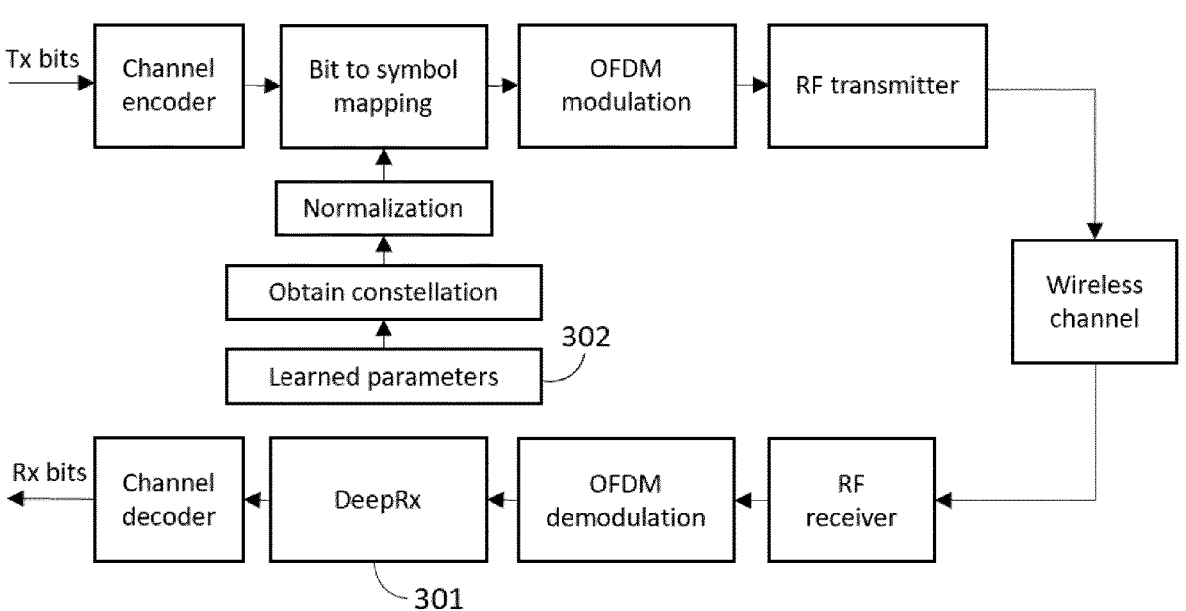
FIG. 3 illustrates a system block diagram according to an exemplary embodiment.

FIG. 3 illustrates a system block diagram for this type of scheme according to an exemplary embodiment. In FIG. 3, blocks 301 and 302 depict the trainable or adjustable components. The learned parameters 302 refer to the parameters $\alpha$ and $\beta$ described above. For example, a DeepRx-type learned receiver 301 may be used, which has been trained to operate with certain constellation shapes without any pilots, processing a single slot at a time (e.g., a slot comprising 14 OFDM symbols). DeepRx is a deep learning receiver comprising a deep fully convolutional artificial neural network. In the considered example case, the constellation corresponds to the transformed QAM constellation defined above, where the parameters $\alpha$ and $\beta$ can be learned and adjusted. Examples of the constellation shape, along with performance comparisons to legacy systems, are presented in FIGS. 10 and 11. Note that it is possible to (i) learn the parameters of the constellation jointly with the DeepRx receiver, or (ii) consider a pre-defined set of constellation shapes and train the DeepRx receiver to support those. Some exemplary embodiments can be applied for the signaling involved in both of these approaches, although the case (ii) of having certain pre-defined values may be a more efficient approach.

With these two adjustable parameters, the parameterized constellation may facilitate efficient signaling of a constellation to be used by the transmitter (e.g., upon initial access by a UE, to be used for PUSCH transmissions), as well as real-time updates to the constellation shape, for example under changing velocity, or under online learning.

For instance, consider a case where an arbitrary constellation is communicated using 16 bits per quantity (e.g., 32 bits for a single complex-valued constellation point). Assuming a 256-point constellation, 8192 bits would need to be transmitted to agree on the constellation (or to change the constellation points). Considering the parameterized constellation of some exemplary embodiments, which can be characterized for example with the two parameter values (i.e., 32 bits in total), this overhead can be reduced to just 0.4%. However, in practice, the overhead of the two constellation parameters may be even smaller, for example if they are communicated as indices of a look-up table.

In one exemplary embodiment, the two parameters may have 16 discrete values per parameter, meaning that 8 bits are used to communicate the values of $\alpha$ and $\beta$. Table 1 below shows an example for the possible discrete values of $\alpha$ and $\beta$ according to this exemplary embodiment.

TABLE 1

| Index | $\alpha$ | $\beta$ |
|---|---|---|
| 0 | 0.5500 | 0.0000 |
| 1 | 0.5800 | 0.0200 |
| 2 | 0.6100 | 0.0400 |
| 3 | 0.6400 | 0.0600 |
| 4 | 0.6700 | 0.0800 |
| 5 | 0.7000 | 0.1000 |
| 6 | 0.7300 | 0.1200 |
| 7 | 0.7600 | 0.1400 |
| 8 | 0.7900 | 0.1600 |
| 9 | 0.8200 | 0.1800 |
| 10 | 0.8500 | 0.2000 |
| 11 | 0.8800 | 0.2200 |
| 12 | 0.9100 | 0.2400 |
| 13 | 0.9400 | 0.2600 |
| 14 | 0.9700 | 0.2800 |
| 15 | 1.0000 | 0.3000 |

Signaling procedures according to some exemplary embodiments are described in the following. To provide concrete examples, 5G uplink (UL) is used as the basis, and the signaling is incorporated by modifying the 5G procedures. However, it should be noted that some exemplary embodiments are not limited to 5G, and they may also be applicable to 6G and beyond.

Figure 4:
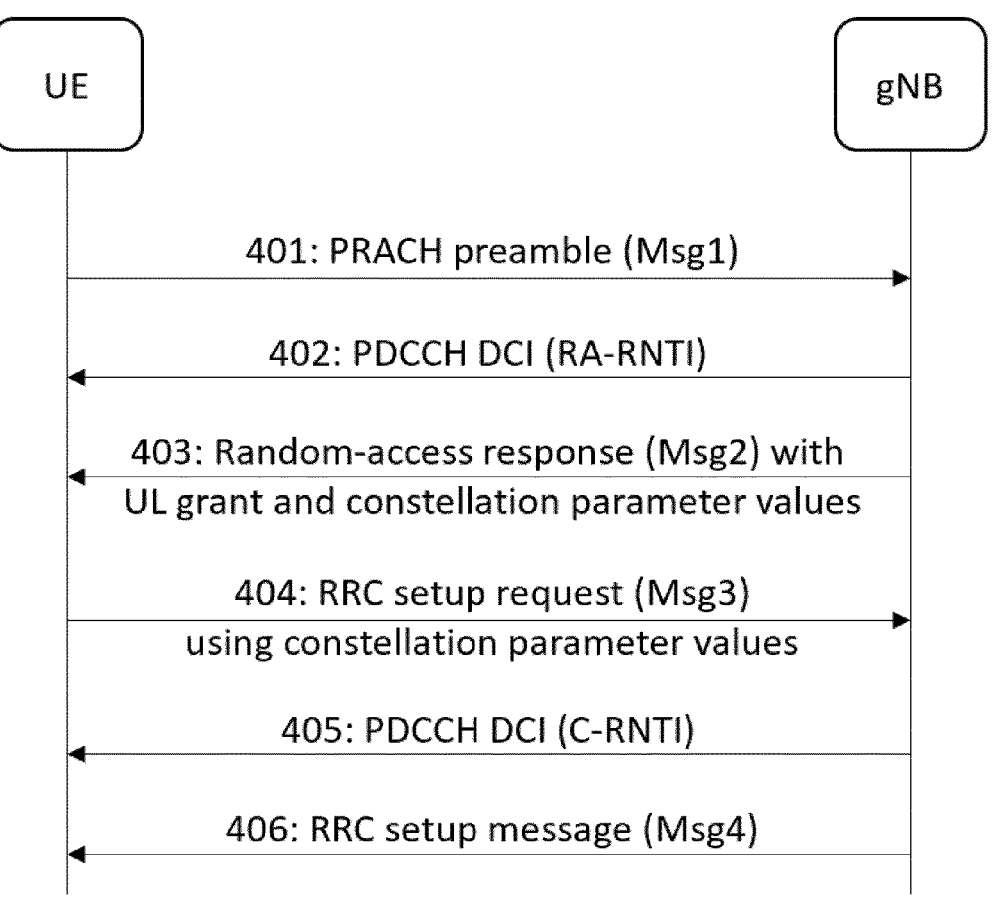
FIGS. 4-6 illustrate signaling diagrams according to some exemplary embodiments.

FIG. 4 illustrates a signaling diagram according to an exemplary embodiment for the procedure for agreeing on the used constellation at initial access. This exemplary embodiment is illustrated based on the 5G random-access procedure, for example.

Referring to FIG. 4, in step 401, a UE transmits a physical random-access channel (PRACH) preamble to a base station such as a gNB. The PRACH preamble may also be referred to as Msg1.

In step 402, the gNB transmits physical downlink control channel (PDCCH) downlink control information (DCI) indicating a random-access radio network temporary identifier (RA-RNTI).

In step 403, the gNB transmits a random-access response (RAR) to the UE. The RAR may also be referred to as Msg2. The RAR may comprise information regarding UL grant and a temporary cell radio network temporary identifier (C-RNTI), as well as the values of the constellation parameters $\alpha$ and $\beta$.

That is, the RAR UL grant may comprise the following elements in this exemplary embodiment: frequency hopping flag (1 bit), Msg3 PUSCH frequency resource allocation (14 bits), Msg3 PUSCH time resource allocation (4 bits), modulation and coding scheme (MCS) (4 bits), a transmit power control (TPC) command for Msg3 PUSCH (3 bits), a channel state information (CSI) request (1 bit), and the values of the constellation parameters (8 bits).

In step 404, the UE uses the transformed constellation corresponding to the values of the constellation parameters to transmit an RRC setup request to the gNB, omitting the pilots (e.g., DMRS and PTRS) from the transmitted signal.

In step 405, the gNB transmits PDCCH DCI indicating a C-RNTI to the UE without including the pilots in the PDCCH transmission.

In step 406, the gNB transmits an RRC setup message to the UE. The RRC setup message may also be referred to as Msg4.

After the UE has successfully received the RRC setup message and the access procedure is finalized, the UE continues to use the values of the constellation parameters α and β, when communicating with the gNB, unless instructed otherwise. It should also be noted that, if the constellation parameters are such that the transformation results in legacy QAM symbols, the UE should resort to the legacy QAM symbols and include the demodulation reference signal (DMRS) and phase-tracking reference signal (PTRS) pilots to the signal to be transmitted. As a non-limiting example, parameter values α=1 and β=0 may result in the legacy QAM symbols.

It may also be possible to adapt the constellation parameters after initial access, for example if the velocity of the UE changes. There may be also other changes in the environment that can be used to trigger a change in the constellation parameters (such as a reduction in performance not explained by signal-to-noise-ratio, SNR, or a significant reduction in the average SNR). In this case, the constellation parameters may be communicated for example with DCI, which is illustrated in FIG. 5.

Figure 5:
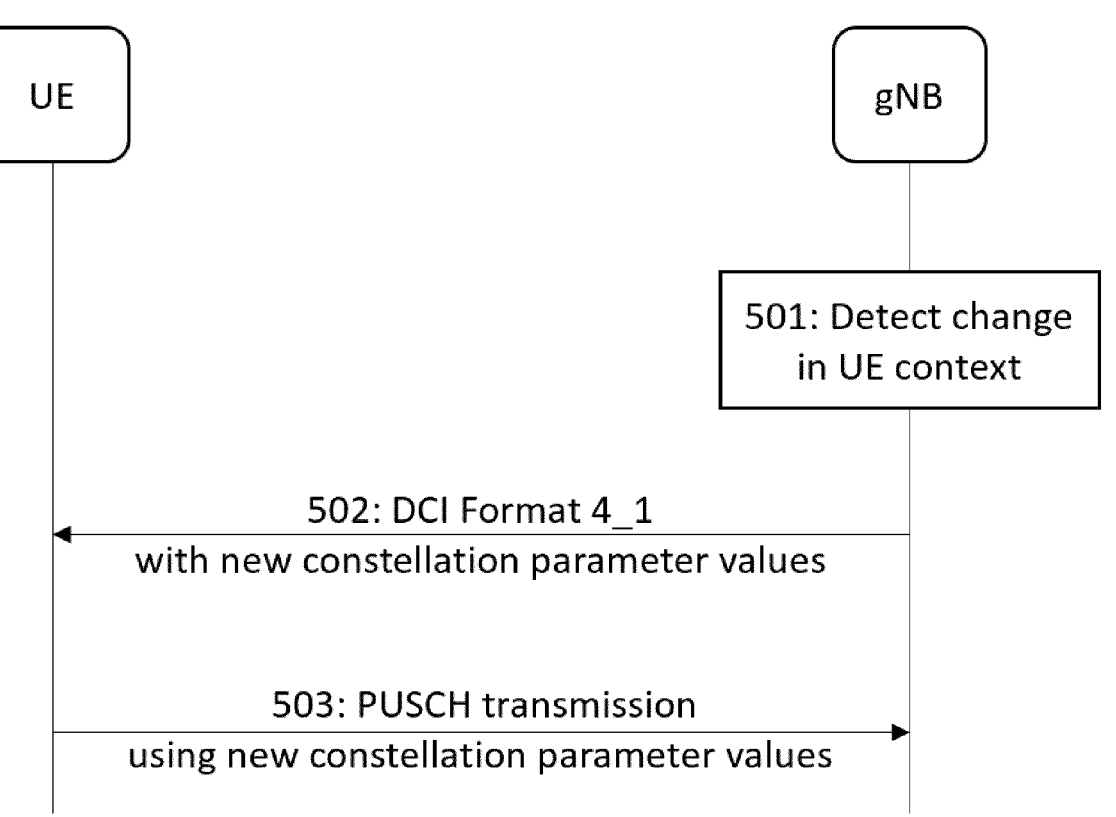

FIG. 5 illustrates a signaling diagram according to an exemplary embodiment. Using again 5G signaling as the basis, a new DCI Format 4_1 is introduced herein, which is otherwise similar to DCI Format 0_1, but instead of the DMRS and PTRS fields (PTRS-DMRS association & DMRS sequence init.), it comprises the values of the constellation parameters (two 4-bit fields for α and β, respectively). This format may be used whenever the base station detects a need to adjust the constellation parameters. FIG. 5 illustrates PUSCH scheduling with DCI Format 4_1, when constellation parameter values are provided to the UE.

Referring to FIG. 5, in step 501, a base station such as a gNB detects a change in UE context. The change may comprise at least one of: a change in a velocity of the UE, a change in channel conditions between the gNB and the UE, and/or a change in average received signal power from the UE. In other words, the gNB detects a need to adjust the constellation parameters.

In step 502, in response to the detection, the gNB transmits, to the UE, DCI Format 4_1 comprising new values for the constellation parameters α and β.

In step 503, the UE uses the transformed constellation corresponding to the new values of the constellation parameters to transmit one or more PUSCH transmissions to the gNB.

In case there is no need to adjust the constellation parameters, but the PUSCH transmissions still use the previously agreed transformed constellation without using pilots, DCI Format 4_0 may be used for scheduling PUSCH. This signaling is illustrated in FIG. 6.

Figure 6:
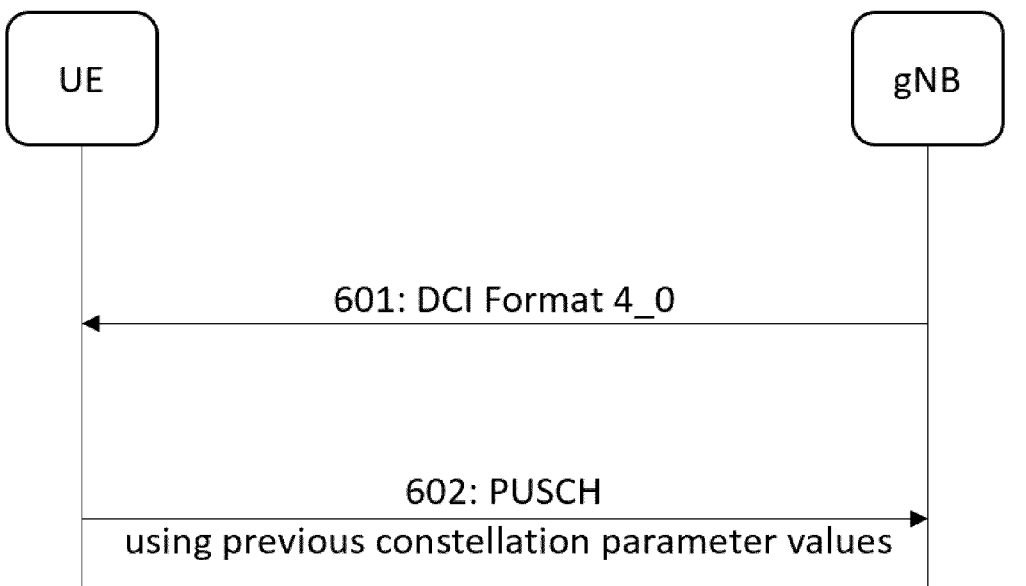

FIG. 6 illustrates a signaling diagram according to an exemplary embodiment for PUSCH scheduling with DCI Format 4_0, when no changes in constellation parameters are needed. DCI Format 4_0 is otherwise similar to DCI Format 4_1, but it does not contain the fields for α and β. In other words, DCI Format 4_0 is similar to the currently specified DCI Format 0_1, but without the DMRS and PTRS related fields.

Referring to FIG. 6, in step 601, a base station such as a gNB transmits DCI Format 4_0 to a UE, when no change is needed in the constellation parameters α and β, thus continuing pilot-less PUSCH transmissions.

In step 602, the UE uses the previously agreed transformed constellation corresponding with the previous constellation parameter values to transmit one or more PUSCH transmissions without any pilots.

In case the UE should start to use legacy PUSCH with pilots (DMRS and PTRS), the gNB may schedule the PUSCH using the DCI Format 0_1. This may implicitly instruct the UE to set α=1 and β=0, and to insert pilots to the upcoming PUSCH transmissions.

Figure 7:
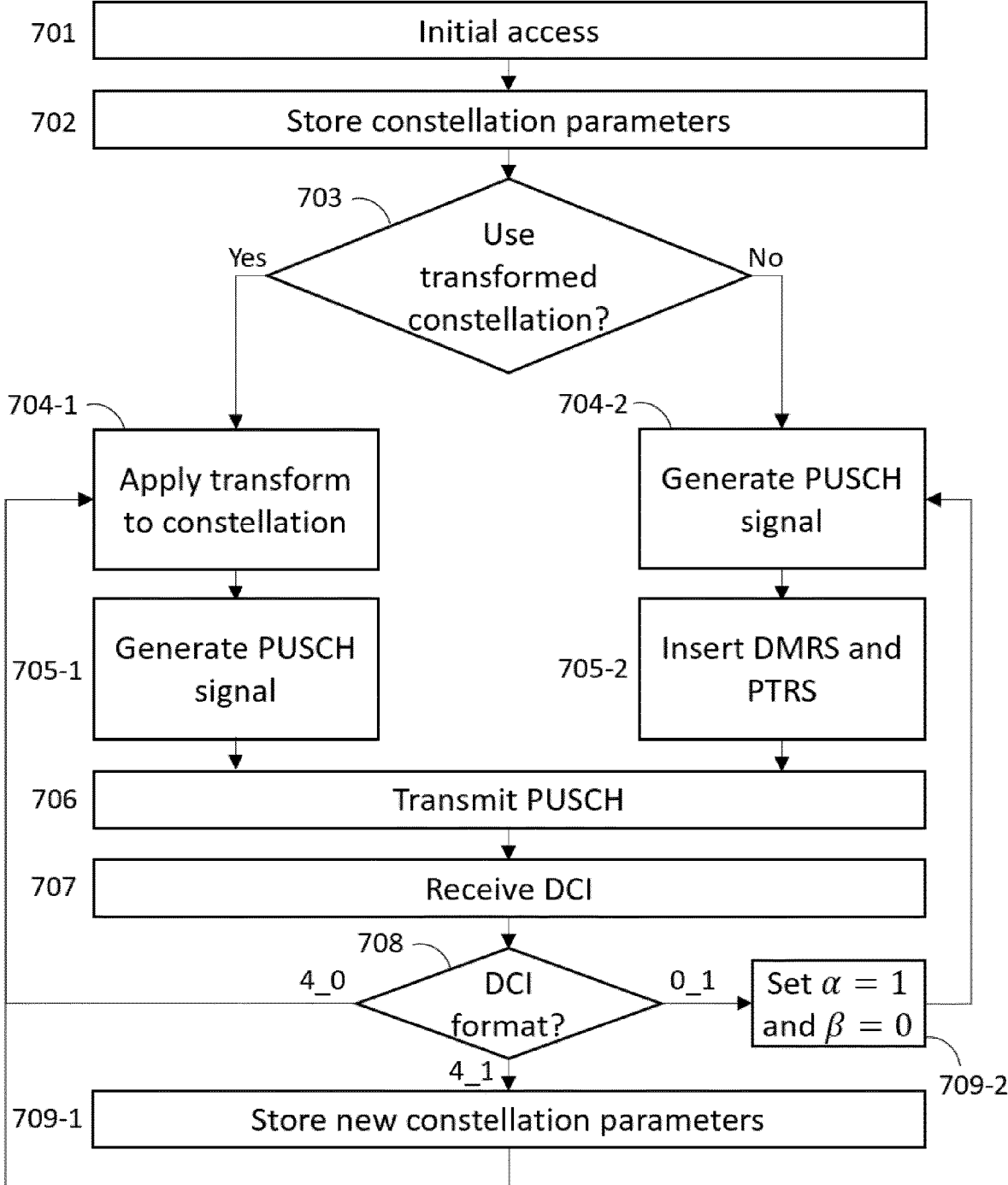

FIG. 7 illustrates a flow chart according to an exemplary embodiment to describe the UE behaviour on a high level. In other words, the steps illustrated in FIG. 7 may be performed by an apparatus such as, or comprised in, a UE. The UE may also be referred to as a user device, user equipment, or terminal device herein.

Referring to FIG. 7, in step 701, the UE performs an initial access procedure (i.e., random-access procedure) to obtain initial access to a gNB. During the initial access procedure, the UE obtains initial constellation parameter values from the gNB.

In step 702, the UE stores the initial constellation parameter values from the initial access to its memory.

In step 703, the UE determines whether or not to use a transformed constellation corresponding to the initial constellation parameter values.

In step 704-1, if the UE determines to use the transformed constellation (703: yes), then the UE uses the constellation parameter values to transform the constellation.

In step 705-1, following step 704-1, the UE generates a PUSCH signal based on the transformed constellation.

Alternatively, in step 704-2, if the UE determines to not use the transformed constellation (703: no), then the UE generates a PUSCH signal without using the transformed constellation.

In step 705-2, following step 704-2, the UE inserts DMRS and PTRS to the PUSCH signal.

In step 706, following step 705-1 or step 705-2, the UE transmits the generated PUSCH signal.

In step 707, the UE receives DCI from the gNB.

In step 708, the UE determines the format of the DCI.

In step 709-1, if the DCI format is DCI Format 4_1 (708: 4_1), then the UE stores the new constellation parameter values provided in the DCI Format 4_1 to its memory, and the process returns to step 704-1, wherein the UE uses the most recently provided values of the constellation parameters provided in the DCI Format 4_1.

Alternatively, if the DCI format is DCI Format 4_0 (708: 4_0) indicating that no change in the constellation parameters is needed, then the process returns to step 704-1 following step 708. In other words, if the PUSCH is scheduled with DCI Format 4_0, then the UE utilizes the constellation parameter values it has in its memory from either the initial access or from the most recent DCI Format 4_1.

In step 709-2, if the DCI format is DCI Format 0_1 (708: 0_1), i.e., no transformation is instructed, then the UE sets the values of the constellation parameters as α=1 and β=0, and the process returns to step 704-2. In other words, the UE resorts to legacy PUSCH transmission with DMRS and PTRS upon receiving DCI Format 0_1.

As for the gNB behavior, the selection of constellation transformation parameters may depend on the receiver capabilities and amount of knowledge regarding the UE channel conditions. If the gNB has an ML receiver capable of pilot-less detection, it may use the transformed constellation by scheduling PUSCH with DCI Format 4_0 or 4_1, as this may increase the UL throughput. The optimal constellation parameters for the current scenario can be then deduced based on UL channel estimates and any other relevant information, such as UE velocity estimates. On the other hand, a gNB with no ML receiver may specify $\alpha=1$ and $\beta=0$ at initial access and schedule PUSCH with DCI Formats 0_0 and 0_1.

FIG. 8 illustrates a flow chart according to an exemplary embodiment. The steps illustrated in FIG. 8 may be performed by an apparatus such as, or comprised in, a UE. The UE may also be referred to as a user device, user equipment, or terminal device herein.

Referring to FIG. 8, in step 801, a signal constellation is transformed based on one or more parameter values, wherein the one or more parameter values indicate a shape of the transformed signal constellation.

The shape of the transformed signal constellation refers to a distribution of the corresponding individual constellation points in the utilized space. For example, the utilized space may be the complex plane, where the complex-valued constellation points represent the phases and amplitudes of individual subcarriers. However, it should be noted that this is just one example, and it is possible to encode the information in other ways as well.

For example, the signal constellation may be transformed by adjusting a scaling of an imaginary axis of the signal constellation based on a first parameter value of the one or more parameter values, and controlling a level of asymmetry of the signal constellation based on a second parameter value of the one or more parameter values. Herein the transformation may refer to a mathematical transformation.

In step 802, one or more signals are transmitted based at least partly on the transformed signal constellation. The one or more signals may be transmitted without any pilot symbols. The one or more signals may be transmitted to a receiver capable of machine learning, such as DeepRx.

FIG. 9 illustrates a flow chart according to an exemplary embodiment. The steps illustrated in FIG. 9 may be performed by an apparatus such as, or comprised in, a network element of a wireless communication network.

Referring to FIG. 9, in step 901, one or more parameter values are indicated to a UE, wherein the one or more parameter values indicate a shape of a transformed signal constellation. For example, a first parameter value of the one or more parameter values may indicate a scaling of an imaginary axis of the transformed signal constellation, and a second parameter value of the one or more parameter values may indicate a level of asymmetry of the transformed signal constellation. The UE may also be referred to as a user device, user equipment, or terminal device herein.

In step 902, one or more signals are received from the UE based at least partly on the transformed signal constellation. The one or more signals may be received without any pilot symbols. The one or more signals may be received by using a receiver capable of machine learning, such as DeepRx.

The steps and/or blocks described above by means of FIGS. 4-9 are in no absolute chronological order, and some of them may be performed simultaneously or in an order differing from the described one. Other steps and/or blocks may also be executed between them or within them.

A technical advantage provided by some exemplary embodiments is that they reduce signaling overhead for communicating the used constellation shape, thus facilitating efficient pilot-less transmissions. Furthermore, some exemplary embodiments may enable using an optimal constellation shape for a given scenario, thanks to the low overhead of communicating the constellation shape. Moreover, some exemplary embodiments facilitate the use of constellation shaping in cellular networks.

Figure 10:
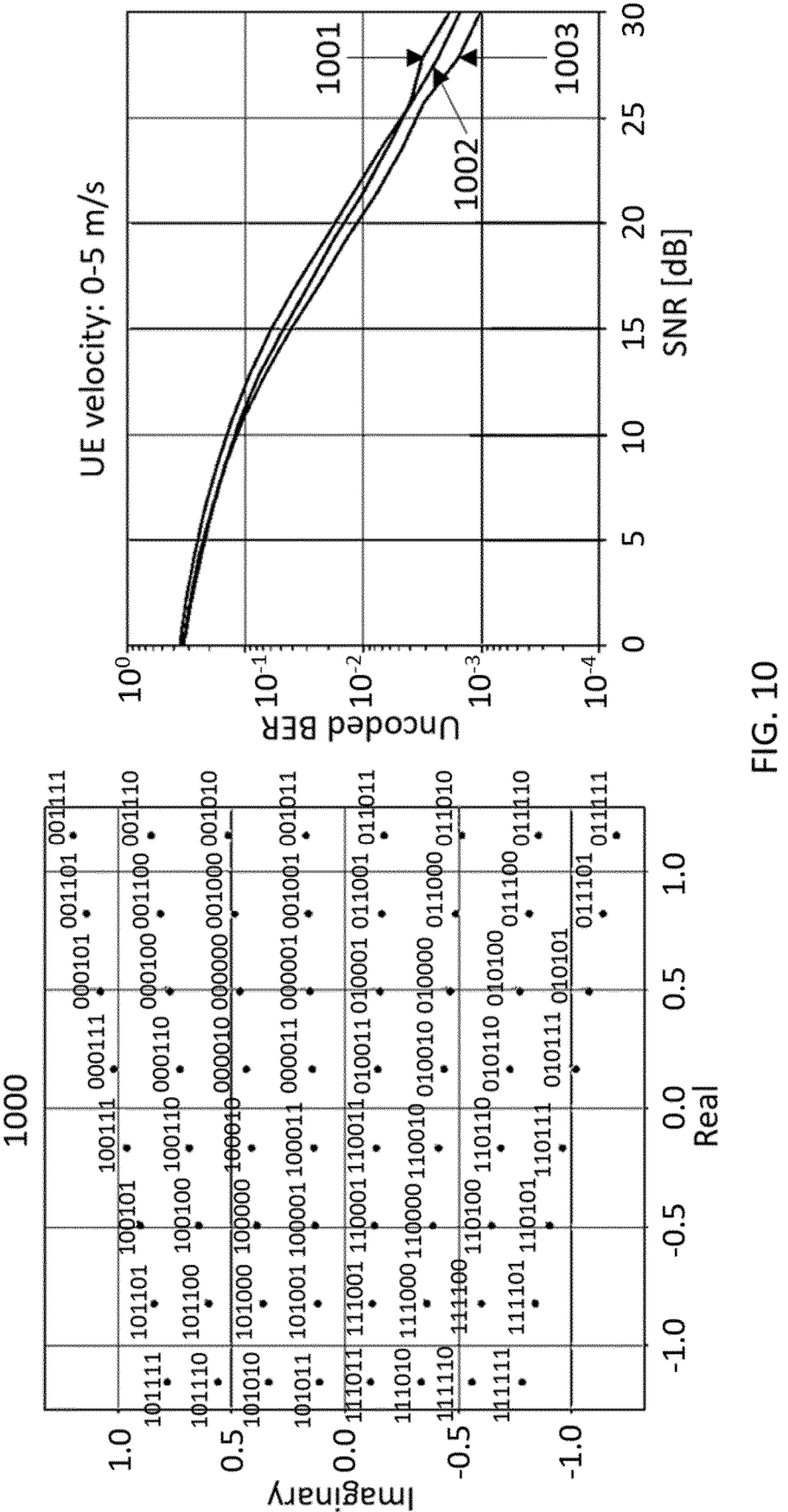
FIGS. 10-11 illustrate examples of constellation shapes and the associated bit error rates according to some exemplary embodiments.

FIG. 10 illustrates an example of a learned constellation shape 1000 according to an exemplary embodiment, wherein the values for $\alpha$ and $\beta$ have been learned jointly with a DeepRx-type receiver under a UE velocity range of 0-5 m/s. In FIG. 10, the constellation shape 1000 represents a distribution of the constellation points of a transformed constellation on the complex plane, where the horizontal axis (x-axis) is the real part, and the vertical axis (y-axis) is the imaginary part. The curves 1001, 1002, 1003 represent the bit error rate (BER), i.e., proportion of erroneously detected bits, with respect to the signal-to-noise ratio (SNR) of the received signal.

In FIG. 10, the BER of the transformed constellation and DeepRx receiver is represented by the curve 1001, together with the BER of a legacy scheme represented by the curve 1002, both with DMRS-based channel estimate, and the BER of a known channel response represented by the curve 1003 (the latter represents the upper bound of the achievable performance). The DMRS configuration used by the legacy baseline comprises two DMRS OFDM symbols per slot, wherein a given slot comprises 14 OFDM symbols. The benefit of utilizing the transformed constellation and DeepRx receiver is evident, as it achieves similar or better BER than the legacy receiver, despite not having the additional overhead of DMRS. Thus, the transformed constellation achieves higher spectral efficiency than the legacy receiver which utilizes pilots. In this example, the learned parameter values are $\alpha \approx 0.679$ and $\beta \approx 0.167$.

Figure 11:
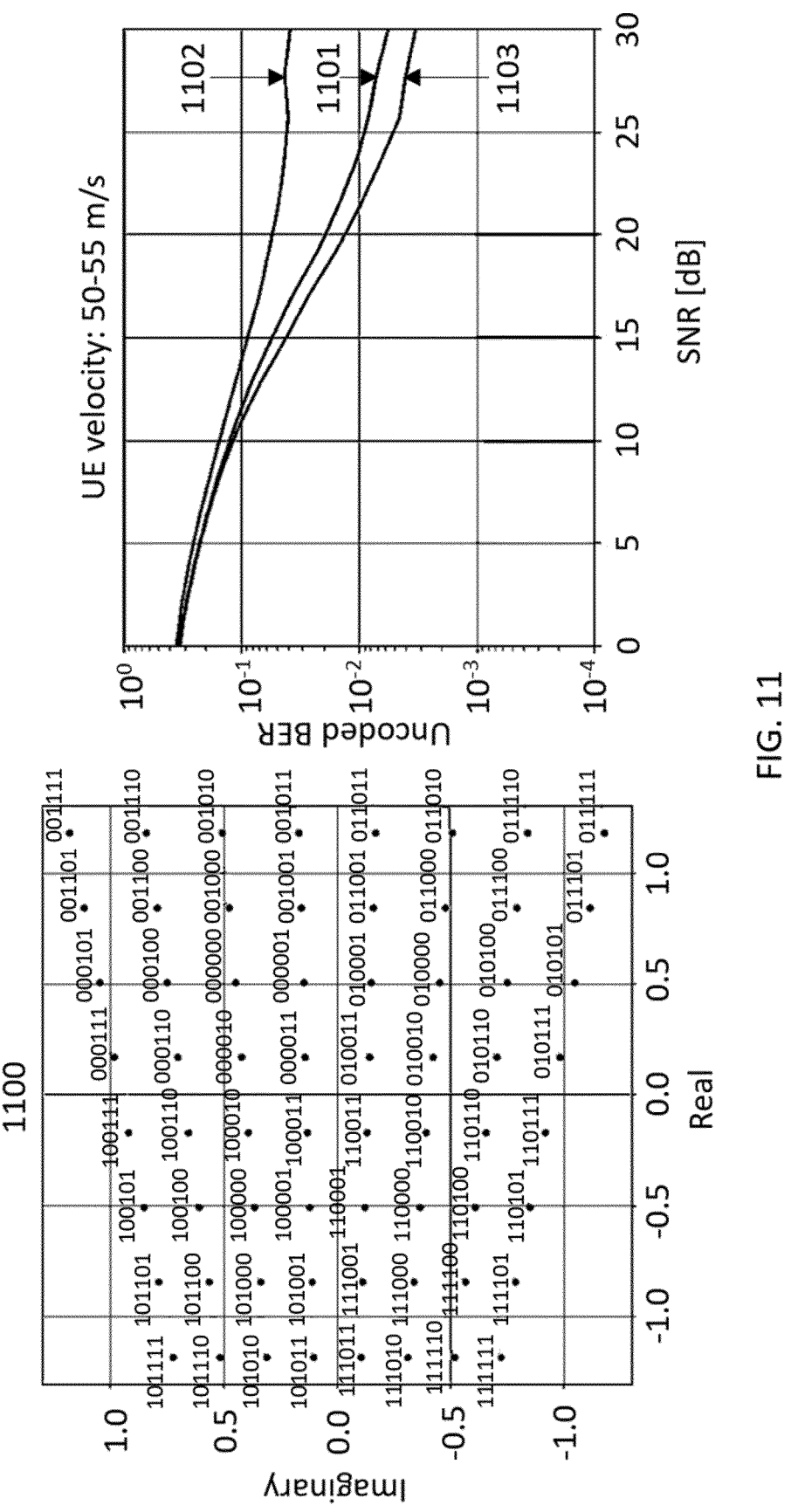

FIG. 11 illustrates an example of a constellation shape 1100 that has been learned under a higher UE mobility of 50-55 m/s according to an exemplary embodiment, in order to more clearly illustrate the effect of velocity on the constellation shape. In FIG. 11, the constellation shape 1100 represents a distribution of the constellation points of a transformed constellation on the complex plane, where the horizontal axis (x-axis) is the real part, and the vertical axis (y-axis) is the imaginary part. The curves 1101, 1102, 1103 represent the BER with respect to the SNR of the received signal.

In FIG. 11, the curve 1101 represents the BER of the transformed constellation and DeepRx receiver, the curve 1102 represents the BER of a legacy receiver, and the curve 1103 represents the BER of a known channel response (i.e., upper bound of the achievable performance). As can be observed by comparing FIGS. 10 and 11, the higher velocity needs a steeper angle for the slope, to facilitate accurate detection of the quickly changing channel. Therefore, the gNB may increase $\beta$ and reduce $\alpha$, if the gNB estimates an increase in the UE velocity. Even though this reduces the separation of the constellation points, this is a favorable trade-off to make due to the challenging channel conditions. Indeed, when investigating the BER of the transformed constellation and DeepRx receiver according to some exemplary embodiments, it can be observed that they outperform the legacy DMRS-based system with a considerable margin. In this example, the learned parameter values are $\alpha \approx 0.532$ and $\beta \approx 0.208$.

Figure 12:
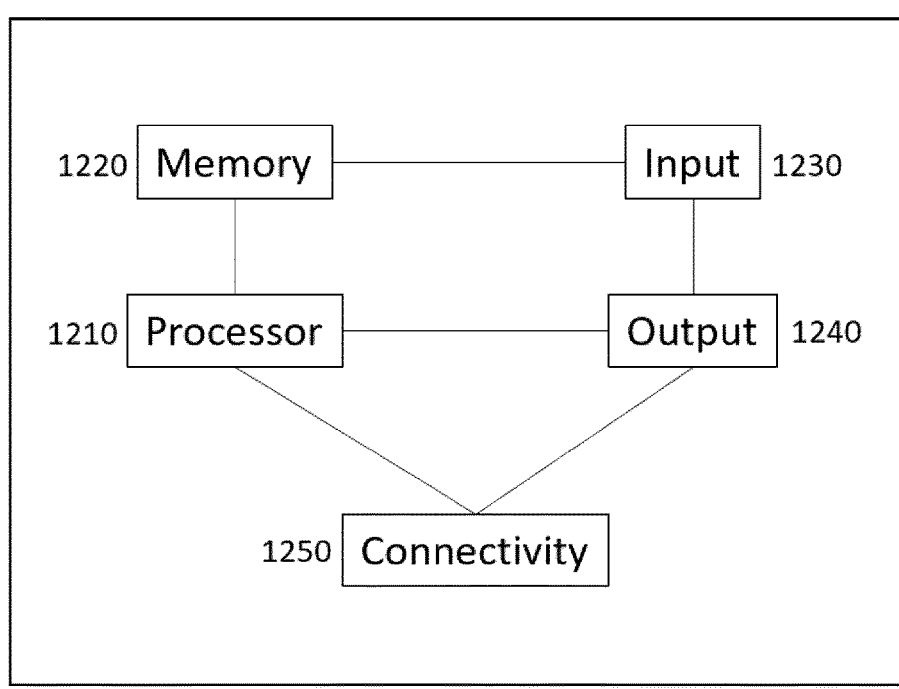
FIGS. 12-13 illustrate apparatuses according to some exemplary embodiments.

FIG. 12 illustrates an apparatus 1200, which may be an apparatus such as, or comprised in, a terminal device, according to an exemplary embodiment. The terminal device may also be referred to as a UE or user equipment herein. The apparatus 1200 comprises a processor 1210. The processor 1210 interprets computer program instructions and processes data. The processor 1210 may comprise one or more programmable processors. The processor 1210 may comprise programmable hardware with embedded firmware and may, alternatively or additionally, comprise one or more application-specific integrated circuits (ASICs).

The processor 1210 is coupled to a memory 1220. The processor is configured to read and write data to and from the memory 1220. The memory 1220 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EE-PROM), flash memory, optical storage or magnetic storage. In general, memories may be referred to as non-transitory computer readable media. The memory 1220 stores computer readable instructions that are executed by the processor 1210. For example, non-volatile memory stores the computer readable instructions and the processor 1210 executes the instructions using volatile memory for temporary storage of data and/or instructions.

The computer readable instructions may have been pre-stored to the memory 1220 or, alternatively or additionally, they may be received, by the apparatus, via an electromagnetic carrier signal and/or may be copied from a physical entity such as a computer program product. Execution of the computer readable instructions causes the apparatus 1200 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1200 may further comprise, or be connected to, an input unit 1230. The input unit 1230 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1230 may comprise an interface to which external devices may connect to.

The apparatus 1200 may also comprise an output unit 1240. The output unit may comprise or be connected to one or more displays capable of rendering visual content, such as a light emitting diode (LED) display, a liquid crystal display (LCD) and/or a liquid crystal on silicon (LCoS) display. The output unit 1240 may further comprise one or more audio outputs. The one or more audio outputs may be for example loudspeakers.

The apparatus 1200 further comprises a connectivity unit 1250. The connectivity unit 1250 enables wireless connectivity to one or more external devices. The connectivity unit 1250 comprises at least one transmitter and at least one receiver that may be integrated to the apparatus 1200 or that the apparatus 1200 may be connected to. The at least one transmitter comprises at least one transmission antenna, and the at least one receiver comprises at least one receiving antenna. The connectivity unit 1250 may comprise an integrated circuit or a set of integrated circuits that provide the wireless communication capability for the apparatus 1200. Alternatively, the wireless connectivity may be a hardwired application-specific integrated circuit (ASIC). The connectivity unit 1250 may comprise one or more components such as a power amplifier, digital front end (DFE), analog-to-digital converter (ADC), digital-to-analog converter (DAC), frequency converter, (de) modulator, and/or encoder/decoder circuitries, controlled by the corresponding controlling units.

It is to be noted that the apparatus 1200 may further comprise various components not illustrated in FIG. 12. The various components may be hardware components and/or software components.

Figure 13:
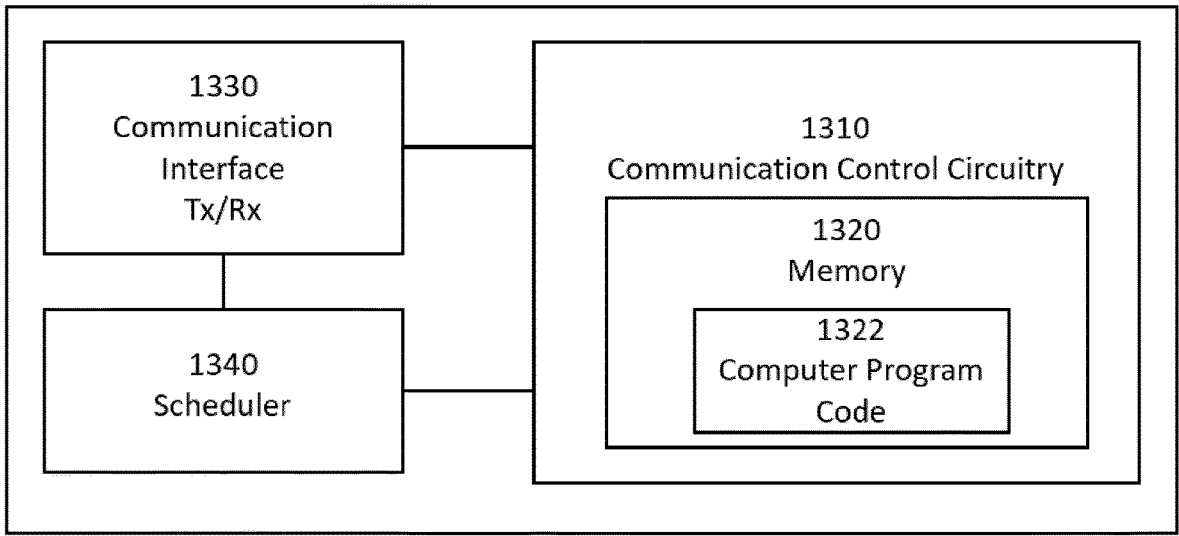

The apparatus 1300 of FIG. 13 illustrates an exemplary embodiment of an apparatus such as, or comprised in, a network element of a wireless communication network. The network element may also be referred to, for example, as a network node, a RAN node, a NodeB, an LTE evolved NodeB (eNB), a gNB, a base station, an NR base station, a 5G base station, an access node, an access point (AP), a relay node, a repeater, a smart repeater, an integrated access and backhaul (IAB) node, an IAB donor node, a distributed unit (DU), a central unit (CU), a baseband unit (BBU), a radio unit (RU), a radio head, a remote radio head (RRH), or a transmission and reception point (TRP).

The apparatus 1300 may comprise, for example, a circuitry or a chipset applicable for realizing some of the described exemplary embodiments. The apparatus 1300 may be an electronic device comprising one or more electronic circuitries. The apparatus 1300 may comprise a communication control circuitry 1310 such as at least one processor, and at least one memory 1320 including a computer program code (software) 1322 wherein the at least one memory and the computer program code (software) 1322 are configured, with the at least one processor, to cause the apparatus 1300 to carry out some of the exemplary embodiments described above. Herein computer program code may refer to instructions that cause the apparatus 1300 to perform some of the exemplary embodiments described above. That is, the at least one processor and the at least one memory 1320 storing the instructions may cause said performance of the apparatus.

The processor is coupled to the memory 1320. The processor is configured to read and write data to and from the memory 1320. The memory 1320 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EE-PROM), flash memory, optical storage or magnetic storage. In general, memories may be referred to as non-transitory computer readable media. The memory 1320 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

The memory 1320 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1300 may further comprise a communication interface 1330 comprising hardware and/or software for realizing communication connectivity according to one or more communication protocols. The communication interface 1330 comprises at least one transmitter (Tx) and at least one receiver (Rx) that may be integrated to the apparatus 1300 or that the apparatus 1300 may be connected to. The communication interface 1330 provides the apparatus with radio communication capabilities to communicate in the cellular communication system. The communication interface may, for example, provide a radio interface to terminal devices. The apparatus 1300 may further comprise another interface towards a core network such as the network coordinator apparatus and/or to the access nodes of the cellular communication system. The apparatus 1300 may further comprise a scheduler 1340 that is configured to allocate resources. The scheduler 1340 may be configured along with the communication control circuitry 1310 or it may be separately configured.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

LIST OF ABBREVIATIONS

4G: fourth generation
5G: fifth generation
6G: sixth generation
ADC: analog-to-digital converter
AI: artificial intelligence
AP: access point
ASIC: application-specific integrated circuit
BBU: baseband unit
BER: bit error rate
CN: core network
CPS: cyber-physical system
C-RNTI: cell radio network temporary identifier
CSI: channel state information
CSSP: customer-specific standard product
CU: central unit
CU-CP: central unit control plane
CU-UP: central unit user plane
DAC: digital-to-analog converter
DCI: downlink control information
DFE: digital front end
DMRS: demodulation reference signal
DRAM: dynamic random-access memory
DSP: digital signal processor
DSPD: digital signal processing device
DU: distributed unit
EEPROM: electronically erasable programmable read-only memory
FPGA: field programmable gate array
GEO: geostationary earth orbit
gNB: next generation nodeB/5G base station
GPU: graphics processing unit
HNB-GW: home node B gateway
IAB: integrated access and backhaul
IMS: internet protocol multimedia subsystem
IoT: internet of things
L1: Layer 1
L2: Layer 2
L3: Layer 3
LCD: liquid crystal display LCOS: liquid crystal on silicon
LED: light emitting diode
LEO: low earth orbit
LLR: log-likelihood ratio
LTE: long term evolution
LTE-A: long term evolution advanced
M2M: machine-to-machine
MAC: medium access control
MANET: mobile ad-hoc network
MCS: modulation and coding scheme
MEC: multi-access edge computing
MIMO: multiple input and multiple output
ML: machine learning
MME: mobility management entity
mMTC: massive machine-type communications
MT: mobile termination
NFV: network function virtualization
NGC: next generation core
NR: new radio
OFDM: orthogonal frequency-division multiplexing
PA: power amplifier
PCS: personal communications services
PDA: personal digital assistant
PDCCH: physical downlink control channel
PDCP: packet data convergence protocol
P-GW: packet data network gateway
PHY: physical
PLD: programmable logic device
PRACH: physical random-access channel
PROM: programmable read-only memory
PTRS: phase-tracking reference signal
PUSCH: physical uplink shared channel
QAM: quadrature amplitude modulation
QPSK: quadrature phase shift keying
RAM: random-access memory
RAN: radio access network
RAP: radio access point
RAR: random-access response
RA-RNTI: random-access radio network temporary identifier
RAT: radio access technology
RI: radio interface
RLC: radio link control
ROM: read-only memory
RRC: radio resource control
RRH: remote radio head
RU: radio unit
RX: receiver
SDAP: service data adaptation protocol
SDN: software defined networking
SDRAM: synchronous dynamic random-access memory
S-GW: serving gateway
SIM: subscriber identification module
SNR: signal-to-noise ratio
SoC: system-on-a-chip
TRP: transmission and reception point
TRX: transceiver
TX: transmitter
UE: user equipment/terminal device
UL: uplink
UMTS: universal mobile telecommunications system
UTRAN: UMTS radio access network
UWB: ultra-wideband
vCU: virtualized central unit
vDU: virtualized distributed unit
WCDMA: wideband code division multiple access WiMAX: worldwide interoperability for microwave access
WLAN: wireless local area network

The invention claimed is:

1. An apparatus comprising at least one processor, and at least one memory including computer program code, wherein the at least one memory and the computer program code are configured, with the at least one processor, to cause the apparatus to:

transform a signal constellation based on one or more parameter values, wherein the one or more parameter values indicate a shape of the transformed signal constellation; and transmit one or more signals based at least partly on the transformed signal constellation, wherein the signal constellation is transformed by adjusting a scaling of an imaginary axis of the signal constellation based on a first parameter value of the one or more parameter values, and controlling a level of asymmetry of the signal constellation based on a second parameter value of the one or more parameter values.

2. The apparatus according to claim 1, wherein the one or more signals are transmitted without any reference signals.

3. The apparatus according to claim 2, wherein the reference signals are pilot symbols.

4. The apparatus according to claim 1, wherein the one or more signals are transmitted to a receiver for machine learning.

5. The apparatus according to claim 1, wherein the signal constellation comprises a quadrature amplitude modulation constellation.

6. The apparatus according to claim 1, wherein the transformed signal constellation is asymmetric.

7. The apparatus according to claim 1, wherein the apparatus is further caused to:

receive an indication indicating whether to transform the signal constellation based on the one or more parameter values.

8. The apparatus according to claim 1, wherein the apparatus is further caused to:

receive a message indicating the one or more parameter values.

9. The apparatus according to claim 8, wherein the message comprises a random-access response.

10. The apparatus according to claim 1, wherein the apparatus is further caused to:

receive downlink control information; and determine, based on a format of the downlink control information, whether to transform the signal constellation based on the one or more parameter values.

11. The apparatus according to claim 10, wherein the downlink control information comprises the one or more parameter values.

12. The apparatus according to claim 1, wherein the apparatus comprises, or is comprised in, a terminal device.

13. An apparatus comprising at least one processor, and at least one memory including computer program code, wherein the at least one memory and the computer program code are configured, with the at least one processor, to cause the apparatus to:

indicate, to a terminal device, one or more parameter values, wherein the one or more parameter values indicate a shape of a transformed signal constellation; and receive, from the terminal device, one or more signals based at least partly on the transformed signal constellation, wherein a first parameter value of the one or more parameter values indicates a scaling of an imaginary axis of the transformed signal constellation, and a second parameter value of the one or more parameter values indicates a level of asymmetry of the transformed signal constellation.

14. The apparatus according to claim 13, wherein the apparatus is further caused to:

detect a change associated with the terminal device, wherein the one or more parameter values are indicated to the terminal device based on detecting the change associated with the terminal device.

15. The apparatus according to claim 14, wherein the change associated with the terminal device comprises at least one of: a change in a velocity of the terminal device, a change in channel conditions between the apparatus and the terminal device, and/or a change in average received signal power.

16. The apparatus according to claim 13, wherein the one or more signals are received from the terminal device without any reference signals.

17. The apparatus according to claim 16, wherein the reference signals are pilot symbols.

18. The apparatus according to claim 13, wherein the one or more signals are received by using a receiver for machine learning.

19. The apparatus according to claim 13, wherein the signal constellation comprises a quadrature amplitude modulation constellation.

20. The apparatus according to claim 13, wherein the transformed signal constellation is asymmetric.

\* \* \* \* \*